United States Patent
Johansson et al.

(10) Patent No.: US 6,641,096 B2
(45) Date of Patent: Nov. 4, 2003

(54) STRETCH RELEASING ADHESIVE TAPE ARTICLE WITH BUNDLING STRAP

(75) Inventors: Ronald C. Johansson, Stillwater, MN (US); James L. Bries, Cottage Grove, MN (US); Robert K. Galkiewicz, Roseville, MN (US); Ned B. Johnson, Minneapolis, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 78 days.

(21) Appl. No.: 09/953,316

(22) Filed: Sep. 13, 2001

(65) Prior Publication Data

US 2003/0049439 A1 Mar. 13, 2003

(51) Int. Cl.[7] ............................. C09J 7/02; B65D 63/10
(52) U.S. Cl. ...................... 248/205.3; 248/205.4; 248/309.1; 428/343; 24/575
(58) Field of Search .................... 248/205.3, 205.4, 248/309.1; 428/343; 24/575

(56) References Cited

U.S. PATENT DOCUMENTS

| 2,144,755 A | 1/1939 | Freedman |
| 2,499,898 A | 3/1950 | Anderson |
| 2,717,437 A | 9/1955 | de Mestral |
| 3,009,235 A | 11/1961 | de Mestral |
| 3,173,184 A | 3/1965 | Ausnit |
| 3,182,345 A | 5/1965 | Smith |
| 3,192,589 A | 7/1965 | Pearson |
| 3,266,113 A | 8/1966 | Flanagan |
| 3,335,774 A | 8/1967 | Reed |
| 3,408,705 A | 11/1968 | Kayser et al. |
| 3,899,805 A | 8/1975 | McMillan |
| 4,024,312 A | 5/1977 | Korpman |
| 4,581,792 A | 4/1986 | Spier |
| 4,819,309 A | 4/1989 | Behymer |
| 4,846,815 A | 7/1989 | Scripps |
| 4,875,259 A | 10/1989 | Appeldorn |
| 5,071,363 A | 12/1991 | Reylek et al. |
| 5,088,164 A | 2/1992 | Wilson et al. |
| 5,097,570 A | 3/1992 | Gershenson |
| 5,113,555 A | 5/1992 | Wilson et al. |
| 5,201,101 A | 4/1993 | Rouser et al. |
| 5,409,189 A | 4/1995 | Lühmann |
| 5,507,464 A | 4/1996 | Hamerski et al. |
| 5,516,581 A | 5/1996 | Kreckel et al. |
| 5,984,247 A | * 11/1999 | Luhmann et al. ......... 248/205.3 |
| 5,989,708 A | 11/1999 | Kreckel |
| 6,004,642 A | 12/1999 | Langford |
| 6,082,686 A | 7/2000 | Schumann |
| 6,131,864 A | 10/2000 | Schumann |
| 6,406,781 B1 | * 6/2002 | Hamerski ................. 428/317.3 |
| 6,499,707 B2 | * 12/2002 | Hamerski et al. ......... 248/205.3 |

FOREIGN PATENT DOCUMENTS

| DE | 33 31 016 C2 | 10/1984 |
| DE | 33 31 016 A1 | 10/1984 |
| WO | WO 95/06691 | 3/1995 |
| WO | WO 99/31193 | 6/1999 |
| WO | WO 01/34717 A1 | 5/2001 |

* cited by examiner

Primary Examiner—Daniel Zirker
(74) Attorney, Agent, or Firm—David B. Patchett

(57) ABSTRACT

A stretch releasing tape article useful for bundling items such as cables, wires, or the like includes a stretch releasing adhesive tape strip, a rigid base plate for attachment with the tape strip, and an elongate flexible strap attached to the base plate that can be arranged around the items and attached to itself to form a closed loop.

16 Claims, 3 Drawing Sheets

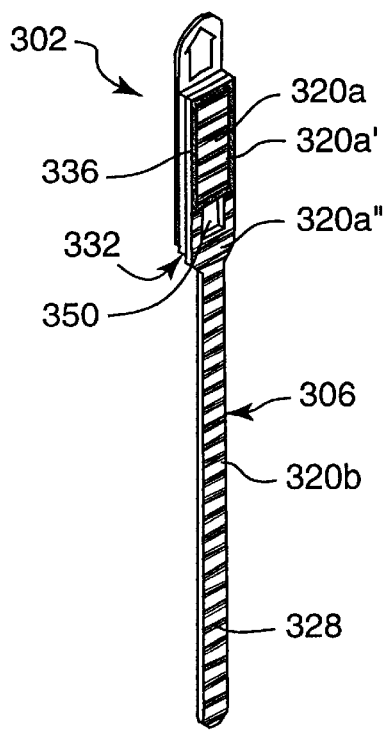
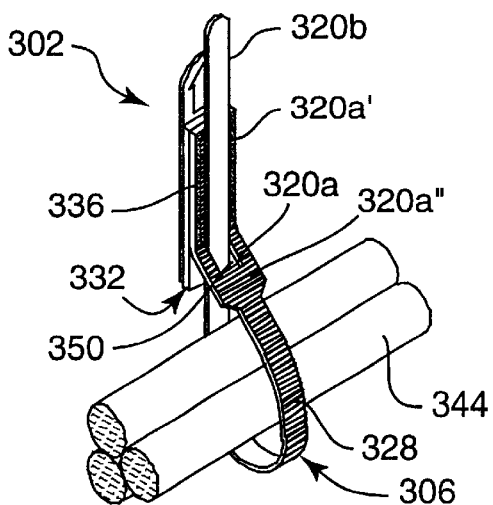
FIG. 3a
FIG. 3b
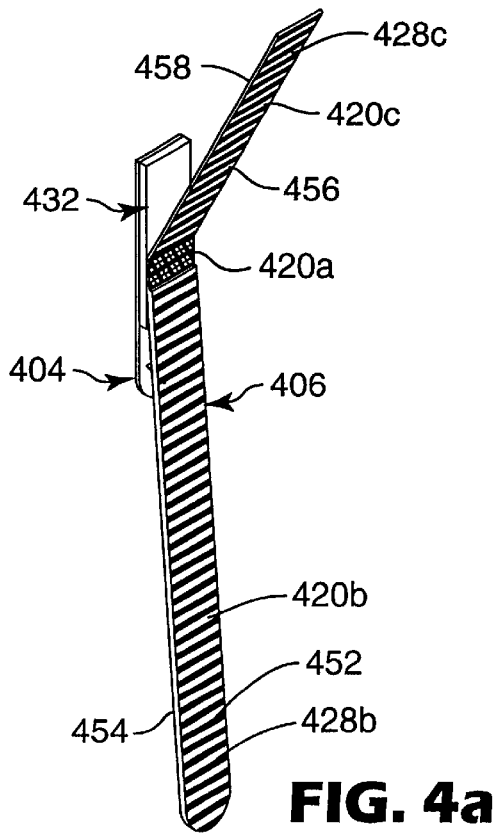
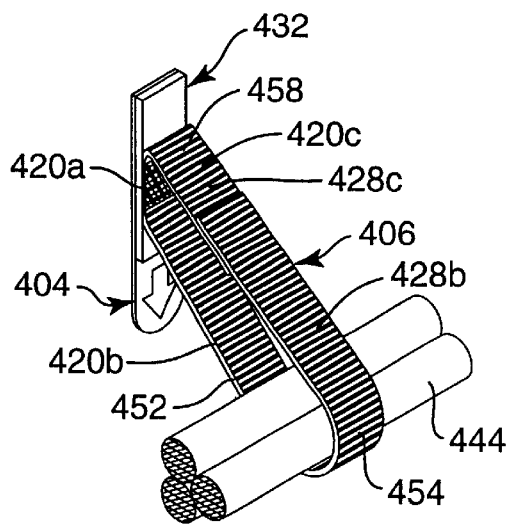
FIG. 4a
FIG. 4b

STRETCH RELEASING ADHESIVE TAPE ARTICLE WITH BUNDLING STRAP

FIELD OF THE INVENTION

The present invention relates generally to stretch releasing adhesive tapes for removably adhesively bonding an item to a surface. More particularly, the present invention relates to a stretch releasing adhesive article that includes a bundling strap for bundling wires, cables, or the like.

BACKGROUND OF THE INVENTION

Stretch releasing adhesive tapes represent an emerging class of high performance pressure-sensitive adhesives combining strong holding power with clean removal and no surface damage. Such stretch releasing adhesive tapes are useful in a wide variety of assembling, joining, attaching, and mounting applications.

Commercial stretch releasing adhesive tapes include the product sold under the trade designation COMMAND by Minnesota Mining and Manufacturing Company, St. Paul, Minn., and the product sold under the trade designation POWER-STRIPS by Beiersdorf AG, Hamburg, Germany. These products are currently manufactured as strips with one end of the strip including a non-adhesive pull tab to facilitate stretching of the strip during the removal process.

A common use for stretch releasing adhesive tapes is for mounting a hook on a surface such as a wall, window, cabinet, or the like. Examples of stretch releasing adhesive tape articles including hooks are disclosed in U.S. Pat. No. 5,409,189 (Lühmann), U.S. Pat. No. 5,507,464 (Hamerski et al.), U.S. Pat. No. 5,989,708 (Kreckel), U.S. Pat. No. 6,082,686 (Schumann), and U.S. Pat. No. 6,131,864 (Schumann). While having their own utility, such articles are not particularly well suited for certain applications such as bundling and mounting cables, wires, or the like, or for other applications requiring a closed loop.

It would therefore be desirable to provide an article for use with stretch releasing adhesive tapes that includes an elongate flexible strap that can be repeatably attached to itself to form a closed loop. Such an article is suited for bundling and mounting cables, wires, or the like, or for other hanging or mounting applications that lend themselves to the use of a closable strap.

SUMMARY OF THE INVENTION

The present invention provides a stretch releasing adhesive tape article including a stretch releasing adhesive tape having opposed major adhesive surfaces, a base plate attached to one adhesive surface, and an elongate flexible strap connected with the base plate that can be attached to itself to form a closed loop.

The particular means selected to attach the strap to itself is not significant to the invention hereof, so long as it provides the desired function. In a particular aspect, the strap can be repeatably attached to itself. Such an article is particularly useful for fastening a group of objects together, such as cables, wires, or the like, and mounting them on a surface, such as a wall surface.

The strap may be attached to itself using a variety of techniques including adhesives, mechanical fasteners having a single protrusion-receptor pair such as the common snap, hook and loop fasteners, self-mating profile extruded fasteners having a plurality of intermeshing or interengaging elements or fasteners such as mushroom shaped fasteners elements, or other known fasteners. In addition, the strap may be a cable tie having conventional cable tie-like fasteners.

In one embodiment, the present invention provides a stretch releasing adhesive tape article to be mounted on a substrate, such as a wall surface, using a stretch releasing adhesive tape strip that has an adhesive portion and a non-adhesive pull tab. The article includes a base plate and a flexible elongate bundling strap. The base plate has a first major surface adapted for attachment to the adhesive portion of the stretch releasing adhesive strip, a second opposed major surface, and first and second ends.

The flexible elongate bundling strap has a first portion, a second portion, and first and second opposed major surfaces. The bundling strap first portion first surface is attached to the base plate second surface and the bundling strap second portion extends beyond the base plate second end. The bundling strap second portion second surface includes a mating surface having a plurality of outwardly projecting fastening elements, wherein the bundling strap second portion can be arranged around at least one item and the mating surface can be folded back and connected to itself, thereby forming a closed loop. In addition, the bundling strap first portion second surface may include fastening elements.

The mating surface may include a region of hook type fastening elements and a region of loop type fastening elements, a self-mating surface, adhesive, or other connection means.

In another embodiment, the bundling strap includes a third portion extending from the bundling strap first portion opposite the bundling strap second portion. One or both opposed major surfaces of the bundling strap third portion may include fastening elements.

In one aspect of the invention, the base plate is elongated along a longitudinal axis collinear with the bundling strap elongated axis. In another aspect, the bundling strap first portion may be attached to a portion of the base plate second surface adjacent the base plate first end, or at a location intermediate the base plate first and second ends. The bundling strap may be attached to the base plate adhesively, ultrasonically welded, or by using other known techniques including mechanical fasteners. The bundling strap may also be rotatably or re-connectably attached to the base plate. Alternatively, the bundling strap and base plate may be extruded as a single unitary piece.

In another embodiment, the bundling strap first portion includes a portion that is attached to the base plate second surface and a portion adjacent the attached portion that overlays the base plate second surface. The overlaying portion contains an opening. In addition, the bundling strap first portion has a first width and the bundling strap second portion has a width narrower than the first width that is capable of passing though the opening. In this way, the bundling strap second portion can be reverse folded toward the base plate and wrapped around at least one item, arranged through the opening, and connected with the bundling strap first portion to form a closed loop.

In a specific embodiment, the present invention provides a stretch releasing adhesive tape article for bundling and mounting items on a substrate that includes a stretch releasing adhesive tape strip, a rigid elongate base plate formed of polypropylene and having a thickness of at least 0.01 inches, and a flexible elongate bundling strap. The adhesive tape strip includes an adhesive portion and a non-adhesive pull tab. The elongate base plate includes a first major surface that adheres to the stretch releasing adhesive tape strip adhesive portion, an opposed second major surface, and first and second ends. The flexible elongate bundling strap includes a first portion, a second portion, and first and second opposed major surfaces. The bundling strap first portion is attached to a portion of the base plate second surface intermediate the base plate first and second ends, and a second portion extends beyond the base plate second end. The bundling strap second portion second surface includes a self-mating surface having a plurality of fastening elements projecting there from, wherein the bundling strap second portion can be arranged around at least one item and the mating surface can be folded back and connected to itself, thereby forming a closed loop.

BRIEF DESCRIPTION OF THE DRAWINGS

The present invention will be further described with reference to the accompanying drawings, in which:

FIG. 1b is a perspective view of the stretch releasing adhesive tape article of FIG. 1a;

FIG. 2b is a sectional view taken along line 2b—2b of FIG. 2a;

FIG. 3a is a perspective view of a third embodiment of the invention;

FIG. 3b is a perspective view of the adhesive tape article of FIG. 3a in its holding condition;

FIG. 4a is a perspective view of a fourth embodiment of the invention; and

FIG. 4b is a perspective view of the adhesive tape article of FIG. 4a in its holding condition.

DETAILED DESCRIPTION

Figure 1A:
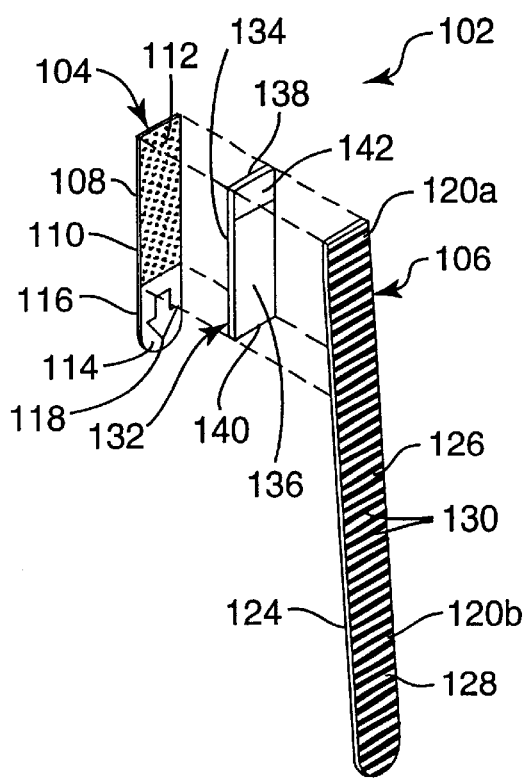
FIG. 1a is an exploded view of a stretch releasing adhesive tape article according to the invention.

Referring now to the Figures, and first to FIGS. 1a–1d, there is shown a stretch releasing adhesive tape article 102 including a stretch releasing adhesive tape strip 104, a base plate 132, and a flexible elongate bundling strap 106.

The stretch releasing adhesive tape strip 104 is provided to removably adhesively bond the article 102 to a substrate such as a wall, cabinet, or the like (not shown). The tape strip 104 includes an adhesive portion 108 having opposed adhesive first and second major surfaces 110, 112, respectively, and a non-adhesive pull tab 114 having opposed non-adhesive first and second major surfaces 116, 118, respectively, that provide means for a user to grasp and stretch the tape strip 104 during the removal process.

The stretch releasing adhesive tape 104 may be any pressure-sensitive adhesive tape that can be adhered firmly to a substrate and thereafter removed by stretching. Such pressure sensitive adhesive tapes can include an elastic backing, a highly extensible and substantially inelastic backing, or can be a tape formed of a solid, elastic pressure sensitive adhesive.

Suitable stretch releasing tapes are described in U.S. Pat. No. 4,024,312 (Korpman), German Patent No. 33 31 016, U.S. Pat. No. 5,516,581 (Kreckel et al.), and PCT International Publication No. WO 95/06691 (Bries et al). In addition, the stretch releasing adhesive tape can include a splittable layer such as the layers described in U.S. Pat. No. 6,004,642 (Langford), or a re-fastenable layer such as the layers described in PCT International Publication No. WO 99/31193. Commercial stretch releasing adhesive tapes include the product sold under the trade designation COMMAND by Minnesota Mining and Manufacturing Company, St. Paul, Minn., and the product sold under the trade designation POWER-STRIPS by Beiersdorf AG, Hamburg, Germany. These products are currently manufactured as discrete strips with one end of the strip including a non-adhesive pull tab to facilitate stretching of the strip during removal. The adhesive surfaces of the strip may additionally be protected with a release liner (not shown).

The base plate 132 includes a first major surface 134, a second opposed major surface 136, a first end 138, and a second end 140. The base plate first major surface 134 is adhesively attached to the adhesive strip 104 adhesive portion 108 second major surface 112. The base plate second major surface 136 is attached to the bundling strap 106 at a region 142 adjacent the base plate 132 first end 138. Alternatively, the entire base plate second major surface 136 may be attached to the bundling strap 106. The base plate 132 may be attached to the bundling strap using tapes, adhesives, by ultrasonic bonding, or by using other known mechanical fasteners or fastening techniques whereby the bundling strap may be re-connectably or rotatably attached to the base plate. Alternatively, the base plate 132 may be molded as a unitary component with the bundling strap 106.

The base plate 132 is elongated along a longitudinal axis collinear with the bundling strap 106 longitudinal axis, and is sized to overlay and adhere to the second surface 112 of the adhesive portion 108 of the adhesive strip 104. To distribute the force applied to the base plate 132 along the adhesive strip 104 and minimize the likelihood of the base plate 132 peeling away from the adhesive strip 104, the base plate 132 is constructed to be stiff or rigid. The stiffness of the base plate 132 will depend on both the material selected to construct the base plate and on the thickness of the base plate. A suitable base plate may be constructed from, for example, polypropylene having a thickness of at least 0.01 inches, typically at least 0.02 inches, more typically at least 0.03 inches, and most typically at least 0.04 inches. Other suitable materials include polystyrene and polyvinyl chloride (PVC).

Providing the base plate 132 between the adhesive strip 104 and the bundling strap 106 serves to reduce the likelihood of the adhesive strip 104 peeling away from the substrate, and reduces the likelihood of the bundling strap 106 peeling away from the base plate 132, thereby increasing the holding power of the article 102 and improving its reliability and performance.

The bundling strap 106 includes a first portion 120a attached to the base plate 132, a second portion 120b extending from the first portion 120a beyond the second end 140 of the base plate 132, a first major surface 124 facing the base plate 132 when the bundling strap 106 is in its unfastened condition, and an opposed second major surface 126.

Figure 1B:
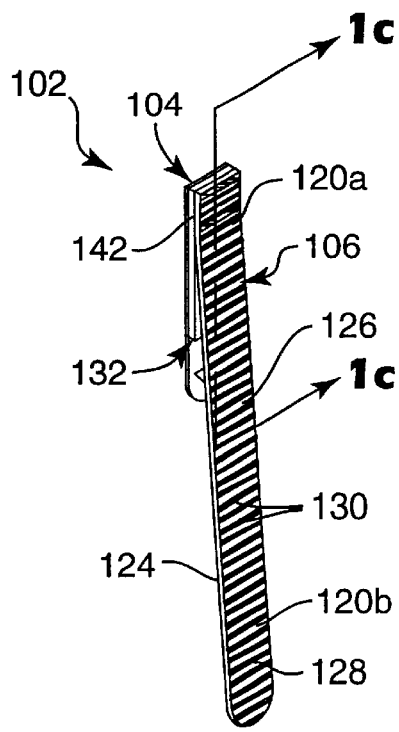
Figure 1C:
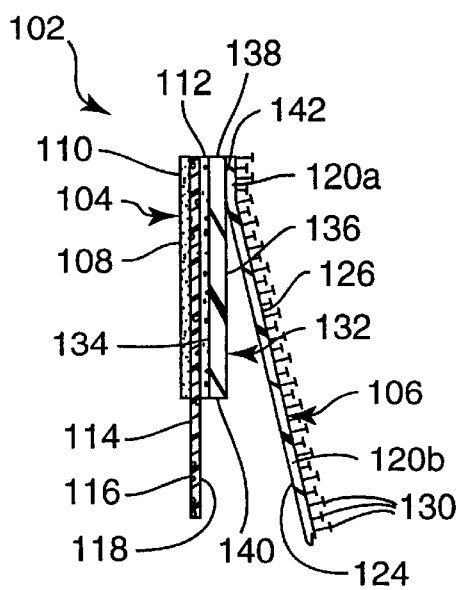
FIG. 1c is a sectional view taken along line 1c—1c of FIG. 1b.
Figure 1D:
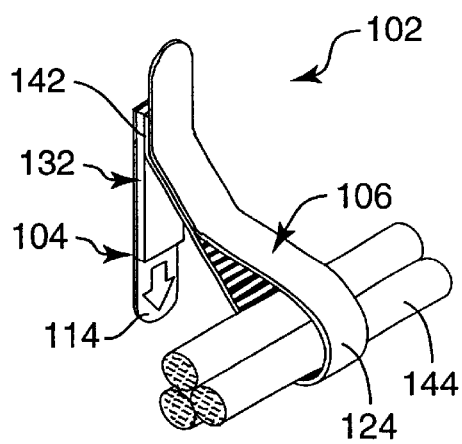
FIG. 1d is a perspective view of the adhesive tape article of FIG. 1a in its holding condition.

The entire second surface 126 of the bundling strap 106 is provided with a mating surface 128 including a plurality of outwardly projecting fastening elements 130 that can be arranged around a bundle of wires 144, folded back, and attached to itself to form a closed loop as shown in FIG. 1d.

The mating surface 128 may be adhesive or may include a number of suitable mechanical fasteners. The fastening elements 130 are preferably self-mating, i.e., the fastening elements are capable of interlockingly engaging other fastening elements having an identical or substantially similar structure. It is not necessary, however, that the fastening of the present invention consist of two substantially similar fastening elements. In addition, the fastening elements are preferably refastenable, i.e., once a fastening element has been connected with a mating surface, it can be pulled away without destroying its ability to connect again with the same mating surface or another mating surface.

It will be recognized, however, that suitable fasteners may take on a variety of forms. One exemplary type includes fasteners having a single protrusion-receptor pair. This type of fastener is illustrated by the common metal snap. Examples of molded or extruded plastic fasteners which utilize protrusion-receptor pairs can be found in U.S. Pat. No. 2,144,755 (Freedman); U.S. Pat. No. 3,173,184 (Ausnit); U.S. Pat. No. 3,182,345 (Smith); U.S. Pat. No. 3,335,774 (Reed); and U.S. Pat. No. 4,819,309 (Behymer). The Behymer patent indicates that the two parts of the fastener can be identical thereby creating what is referred to herein as a self-mating fastener. Conventional cable ties may also be used.

Contrasted with mechanical fasteners that have one or two engaging elements are fasteners that have a multiplicity of such elements. One grouping of such fasteners includes the hook-and-hook fastener described in U.S. Pat. No. 2,717,437 (de Mestral), the hook-and-loop further described in U.S. Pat. No. 3,009,235 (de Mestral), and the headed stem or mushroom-and-loop further described in U.S. Pat. No. 4,846,815 (Scripps).

Another grouping of fasteners using a multiplicity of engaging elements are those that predominantly have solid protrusions including a stem and an expanded region or head at the stem tip. The expanded region or head can have a wide variety of shapes. Normally these fasteners are self-mating wherein the head portion is larger in diameter or cross section than is the space between heads. Exemplary patents describing this type of fastener include, for example, U.S. Pat. No. 2,499,898 (Anderson); U.S. Pat. No. 3,192,589 (Pearson); U.S. Pat. No. 3,266,113 (Flanagan, Jr.); U.S. Pat. No. 3,408,705 (Kayser et al.); and U.S. Pat. No. 5,097,570 (Gershenson).

U.S. Pat. No. 3,899,805 (McMillan) teaches the use of headed hollow protrusions. This type of fastener includes an expanded region fitting into a seat above which is a reduced cross section or restricted pocket and/or by flexing of the stem. Joining of this type of fastener is normally associated with a single or double snap as the fastener is seated.

Another type of fastener having a multiplicity of intermeshing solid protrusions is described in U.S. Pat. No. 4,875,259 (Appeldorn). In this type of fastener, the tips of the protrusions are not expanded or headed. The bond is created by the frictional forces generated between contacting surfaces of the intermeshing protrusions where the surfaces are optically smooth flats. Additional examples of fasteners in this grouping can be found in U.S. Pat. No. 5,071,363 (Reylek et al.); U.S. Pat. No. 5,088,164 (Wilson et al.); U.S. Pat. No. 5,113,555 (Wilson et al.); and U.S. Pat. No. 5,201,101 (Rouser et al.) A fastener based on projections that perforate the web and alternate in rows from one side of the web to the other is disclosed in U.S. Pat. No. 4,581,792 (Spier). This fastener functions by engaging the projections in the receptacles to form a releasable friction fit.

A preferred bundling strap is an elongate strap including a base sheet having on at least one surface an array of parallel, narrowly spaced, elastically deformable ribs that projecting integrally from the surface of the base sheet. The ribs comprise a stem portion attached to and substantially upright from the base sheet, and a flange attached to at least one side of the stem portion and spaced from the base sheet. The outer portion of the underside surface of at least some flanges projects toward the base sheet, and at least some flanges have a substantial thickness over most of their width such that the stem portion deforms in preference to the flange during peel-type disengagement from an identical fastening surface.

Figure 2A:
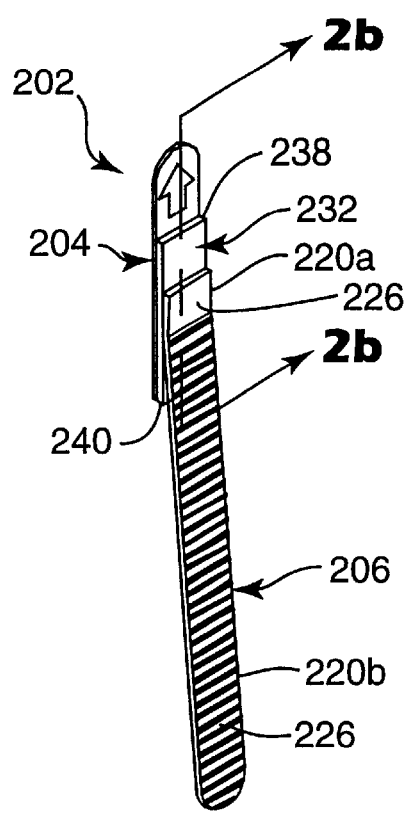
FIG. 2a is a perspective view of a second embodiment of the invention.
Figure 2B:
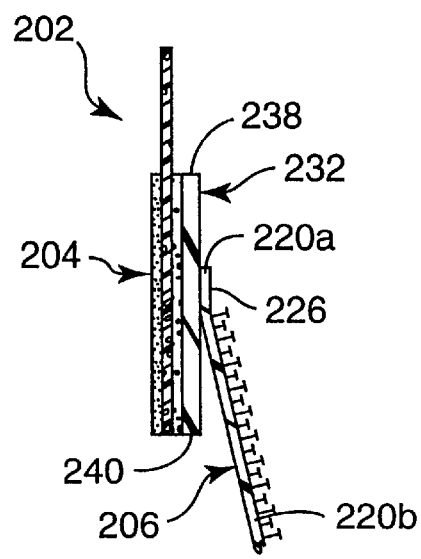

FIGS. 2a–2b show an adhesive tape article 202 similar to the one shown in FIGS. 1a–1d except in FIGS. 2a–2b, the bundling strap 206 is attached to the base plate 232 in a region centrally located between the base plate first 238 and second 240 ends. Features in FIGS. 2a–d, and the remaining FIGS. 3–4, that are functionally similar to those of FIGS. 1a–1b are shown with like reference numerals incremented by 100.

It has been found that attaching the bundling strap 206 to the base plate 232 intermediate the base plate 232 further reduces the likelihood that the adhesive strip 204 will peel away from the substrate. In addition, the first portion 220a second surface 226 of the bundling strap 206 does not include fastening elements. It has also been found that by leaving the first portion 220a second surface 226 free of fastening element, whereby the second portion 220b second surface 226 is attached to itself to form a closed loop, minimizes the likelihood of peel failure of the bundling strap 206 to itself when a force directed perpendicular to the base plate 232 is applied to the bundling strap 206 which would occur, for example, when bundled items are pulled in the direction away from the substrate to which the article 202 is adhered.

FIGS. 3a–3b show another embodiment of the invention in which the bundling strap 306 includes a wide first portion 320a and a narrow second portion 320b. The first portion 320a includes an attached portion 320a' that is attached to the base plate second surface 336, and an overlaying portion 320a" that extends from the attached portion 320a' and overlays, but is not attached to, the base plate second surface 336. The attached portion 320a' contains and opening 350 sized to receive the bundling strap narrow second portion 320b. To secure the bundling strap 306 around a group of items 344, the bundling strap 344 is reverse folded, i.e. with the mating surface 328 facing outwardly away from the bundled items 344, and the narrow second portion 320b is inserted through the opening 350 so the mating surface 328 of the second portion 320b can be attached to the mating surface 328 of the attached portion 320a' of the first portion 320a, as shown in FIG. 3b.

FIGS. 4a–4b show another embodiment of the invention in which the bundling strap 406 includes a first portion 420a attached to the base plate 432, a second portion 420b extending downwardly from the first portion 420a, and a third portion 420c that extends upwardly from the first portion 420a. The second portion 420b and the third portion 420c have opposed first and second major surfaces 452, 454 and 456, 458, respectively, each provided with mating surfaces 428b, 428c, respectively. In this manner, the second portion 420b first surface 452 may be attached to the third portion 420c second surface 458 to form a closed loop around a bundle of wires 444 as shown in FIG. 4b. In addition, however, it will be recognized that either surface of second portion 420b may be attached to either surface of third portion 420c.

As demonstrated in the various embodiments, the non adhesive pull tab of the tape strip may be arranged to extend beyond the end of the first portion of the bundling strap that is adhered to the adhesive strip, or may be arranged adjacent the second portion of the bundling strap, whereby the adhesive tab is likely to be at least partially concealed by the bundling strap. In the case where the pull tab extends behind the bundling strap, the bundling strap is flexed outwardly to access the pull tab during the removal process.

The patents, patent documents, and patent applications cited herein are incorporated by reference in their entirety as if each were individually incorporated by reference. It will be apparent to those of ordinary skill in the art that various changes and modifications may be made without deviating from the inventive concept set forth above. Thus, the scope of the present invention should not be limited to the structures described in this application, but only by the structures described by the language of the claims and the equivalents of those structures.

What is claimed is:

1. A stretch releasing adhesive tape article for bundling and mounting items on a substrate, comprising:
   (a) a stretch releasing adhesive tape strip having an adhesive portion and a non-adhesive pull tab;
   (b) a base plate having first and second opposed major surfaces and first and second ends, said base plate first major surface being adhered to the adhesive portion of said stretch releasing adhesive strip; and
   (c) a flexible elongate bundling strap having a first portion, a second portion, and first and second opposed major surfaces, said bundling strap first portion first surface being attached to said base plate second surface, said bundling strap second portion extending beyond said base plate second end, and said bundling strap second portion second surface including a mating surface, wherein said bundling strap second portion can be arranged around at least one item and said mating surface folded back and connected to itself, thereby forming a closed loop.

2. A stretch releasing adhesive tape article as defined in claim 1, wherein said bundling strap second portion second surface mating surface includes a plurality of fastening elements projecting therefrom.

3. A stretch releasing adhesive tape article as defined in claim 2, wherein said bundling strap first portion second surface is adhesive.

4. A stretch releasing adhesive tape article as defined in claim 1, wherein said bundling strap includes a third portion extending from said bundling strap first portion opposite said bundling strap second portion, said bundling strap third portion having opposed first and second surface major surfaces, at least said third portion first surface including fastening elements for mating engagement with said bundling strap second portion.

5. A stretch releasing adhesive tape article as defined in claim 1, wherein said base plate is elongated along a longitudinal axis collinear with said bundling strap elongated axis.

6. A stretch releasing adhesive tape article as defined in claim 1, wherein said bundling strap first portion is attached to a portion of said base plate second surface.

7. A stretch releasing adhesive tape article as defined in claim 6, wherein said bundling strap is attached to said base plate adjacent said base plate first end.

8. A stretch releasing adhesive tape article as defined in claim 6, wherein said bundling strap is attached to said base plate intermediate said base plate first and second ends.

9. A stretch releasing adhesive tape article as defined in claim 1, wherein said bundling strap is adhesively bonded to said base plate.

10. A stretch releasing adhesive tape article as defined in claim 1, wherein said bundling strap is ultrasonically bonded to said base plate.

11. A stretch releasing adhesive tape article as defined in claim 1, wherein said bundling strap first portion includes an attached portion that is attached to said base plate second surface and an overlaying portion adjacent said attached portion that overlays said base plate second surface, said overlaying portion containing an opening.

12. A stretch releasing adhesive tape article as defined in claim 11, wherein said bundling strap first portion has a first width and said bundling strap second portion has a width narrower than said first width capable of passing though said opening, whereby said bundling strap second portion can be wrapped around at least one item and folded inwardly toward said base plate, arranged through said opening, and connected with said bundling strap first portion to form a closed loop.

13. A stretch releasing adhesive tape article as defined in claim 1, wherein said bundling strap second surface includes a region of hook type fastening elements and a region of loop type fastening elements.

14. A stretch releasing adhesive tape article as defined in claim 2, wherein said fastening elements are capable of being self-matingly engaged.

15. A stretch releasing adhesive tape article for bundling and mounting items on a substrate, comprising:
   (a) a stretch releasing adhesive tape strip having an adhesive portion and a non-adhesive pull tab;
   (b) an elongate base plate having a first major surface being adhered to said stretch releasing adhesive tape strip adhesive portion, an opposed second major surface, and first and second ends; and
   (c) a flexible elongate bundling strap having first and second opposed major surfaces, said bundling strap having a first portion attached to a portion of said base plate second surface intermediate said base plate first and second ends, and a second portion extending beyond said base plate second end, said bundling strap second portion second surface including a mating surface having fastening means for connecting said bundling strap second portion with said bundling strap second portion, wherein said bundling strap second portion can be arranged around at least one item and said mating surface can be folded back and connected to itself, thereby forming a closed loop.

16. A stretch releasing adhesive tape article for bundling and mounting items on a substrate, comprising:
   (a) a stretch releasing adhesive tape strip having an adhesive portion and a non-adhesive pull tab;
   (b) a rigid elongate base plate having a first major surface being adhered to said stretch releasing adhesive tape strip adhesive portion, an opposed second major surface, and first and second ends, said base plate being formed of polypropylene and having a thickness of at least 0.01 inches; and
   (c) a flexible elongate bundling strap having first and second opposed major surfaces, said bundling strap having a first portion attached to a portion of said base plate second surface intermediate said base plate first and second ends, and a second portion extending beyond said base plate second end, said bundling strap second portion second surface including a self-mating surface having fastening means for connecting said bundling strap second portion with said bundling strap second portion, wherein said bundling strap second portion can be arranged around at least one item and said mating surface can be folded back and connected to itself, thereby forming a closed loop.

* * * * *

UNITED STATES PATENT AND TRADEMARK OFFICE
CERTIFICATE OF CORRECTION

PATENT NO. : 6,641,096 B2
DATED : November 4, 2003
INVENTOR(S) : Johansson, Ronald C.

It is certified that error appears in the above-identified patent and that said Letters Patent is hereby corrected as shown below:

Column 6,
Line 14, delete "2a-d", insert in place thereof -- 2a-2d --;

Signed and Sealed this

Twenty-second Day of March, 2005

JON W. DUDAS
*Director of the United States Patent and Trademark Office*